United States Patent [19]

Free

[11] Patent Number: 4,528,233

[45] Date of Patent: Jul. 9, 1985

[54] PHOTOGRAPHIC MOUNTING PROCESS AND COMPOSITION

[76] Inventor: David F. Free, 1236 Deerpark Dr., #65, Fullerton, Calif. 92631

[21] Appl. No.: 543,074

[22] Filed: Oct. 18, 1983

Related U.S. Application Data

[60] Division of Ser. No. 287,205, Jul. 27, 1981, Pat. No. 4,410,386, which is a continuation-in-part of Ser. No. 259,151, Apr. 30, 1981, abandoned, which is a continuation of Ser. No. 63,861, Aug. 6, 1979, abandoned.

[51] Int. Cl.[3] .......................... B32B 3/00; B32B 7/14

[52] U.S. Cl. .................................. 428/205; 156/155; 156/235; 156/240; 156/249; 156/316; 156/318; 427/146; 428/914; 430/373; 430/432; 430/933

[58] Field of Search .................. 430/238, 9, 372, 373, 430/432, 449, 933, 950, 954; 427/146, 147; 428/29, 67, 202, 204, 914, 205; 156/155, 230, 235, 236, 240, 249, 277, 314, 316, 318

[56] References Cited

U.S. PATENT DOCUMENTS

| | | | |
|---|---|---|---|
| 2,657,140 | 10/1953 | Kessels | 430/149 |
| 3,334,003 | 8/1967 | Edwards | 156/249 |
| 3,507,653 | 4/1970 | Preddy et al. | 430/9 |
| 3,924,026 | 12/1975 | Penfield | 156/230 |
| 3,985,602 | 10/1976 | Stuart | 156/235 |
| 4,065,596 | 12/1977 | Groody | 428/339 |
| 4,209,328 | 6/1980 | Sato et al. | 430/238 |
| 4,410,386 | 10/1983 | Free | 156/235 |
| 4,470,861 | 9/1984 | Kravig et al. | 156/277 |

*Primary Examiner*—Jay H. Woo
*Assistant Examiner*—Timothy W. Heitbrink
*Attorney, Agent, or Firm*—Lyon & Lyon

[57] ABSTRACT

A process and chemical composition for laminating a photograph or lithograph onto canvas are disclosed whereby the resulting product appears similar to an oil painting, as well as providing improved depth. The process involves stripping a photograph or lithograph from a substantial portion of its backing, followed by application of the chemical composition to the photograph. The chemical composition includes a surfactant and an optical brightener such as a fluorescent whitening agent, and can include a sensitizer and stabilizer. The treated photograph or lithograph is then bonded to a textured backing at elevated temperature and pressure.

33 Claims, 1 Drawing Figure

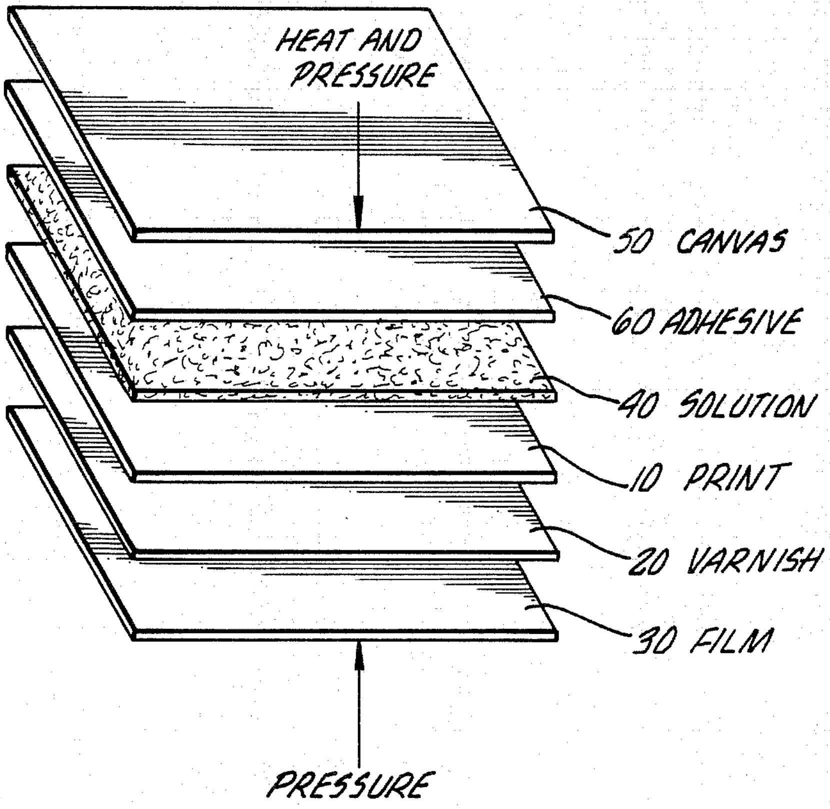
HEAT AND PRESSURE
50 CANVAS
60 ADHESIVE
40 SOLUTION
10 PRINT
20 VARNISH
30 FILM
PRESSURE

PHOTOGRAPHIC MOUNTING PROCESS AND COMPOSITION

CROSS-REFERENCE

This is a division of application Ser. No. 287,205, filed July 27, 1981, now U.S. Pat. No. 4,410,386 which is a continuation-in-part of application Ser. No. 259,151, filed on Apr. 30, 1981 now abandoned which is a continuation of application Ser. No. 63,861 filed Aug. 6, 1979, now abandoned.

BACKGROUND

This invention relates generally to lamination processes, but relates more specifically to processses and techniques for mounting photographs, lithographs, and similar type prints. Various processes by which photographs are mounted onto canvas are known in the art. Two of the best known such processes are those used by McDonald Photo Products of Dallas, Tex., and by Ademco Ltd. of England.

The process employed by McDonald Photo Products involves stripping a photographic print, applying an adhesive such as Lamin-All (trademark of McDonald), and allowing the adhesive to dry. The print is then positioned on the canvas, with the adhesive against the canvas, and the combination is pressed for 45 seconds at about 100° C. in a photograph mounting press such as a McDonald Professional IV Series Press to affix the canvas backing to the photograph.

In the Ademco process, heat seal film such as Specialtex (trademark of Ademco) is first applied to the face of a photograph. The backing is then stripped from the photograph. The stripped photograph is then affixed to a piece of dry mount film, and the combination is then affixed to the canvas. The photograph-canvas combination is then bonded together in a hardbed press for two minutes at 85°–95° C.

Although the basic object of both the Ademco and McDonald processes has been to provide a mounted photograph which greatly resembles an oil painting, neither process has been entirely successful in achieving this goal. More specifically, the brightness and depth achieved by both processes have been insufficient, and neither process has provided a product having the glisten, glow, and luminance of an oil painting. Likewise the products resulting from the above processes do not achieve the slightly diffused appearance of an oil painting. Further, since neither the Ademco process nor the McDonald process completely removes the fiber backing, extremes of pressure have been required during mounting to sufficiently drive the texture or weave of the backing material into the print.

In view of these problems with the prior art processes, it is apparent there is a need for a photographic mounting process that provides good texture of the photograph without the need for extreme pressures during mounting, provides improved depth and brilliance, and results in a photograph with high durability, where the photograph has the appearance of an oil painting.

SUMMARY

The present invention is directed to a photographic mounting process that has these features and utilizes a novel chemical composition.

The present invention improves upon the limitations of the conventional canvas mounting systems in several respects. The process of the present invention employs a photograph having a glossy surface which is additionally coated to provide depth, brilliance, and fade resistance. The coated, glossy photograph is then heatsealed and stripped in a manner similar to the Ademco process described above.

The back of the photograph is then wetted with the novel chemical composition which includes a surfactant and an optical brightener. The chemical composition is allowed to soak into the print and the excess is removed. The print is thereafter positioned on adhesive impregnated canvas, and the combination is bonded in a press for a period of time at elevated temperature. The pressure and temperature permit the chemical composition to penetrate to the photographic emulsion, and also permit better penetration of the canvas weave into the emulsion.

These and other features of the present invention will be better appreciated from the following detailed description, appended claims, and accompanying drawing which is a schematic diagram reflecting the various materials used in practicing the process of the patent invention.

DETAILED DESCRIPTION OF THE INVENTION

Referring to the single FIGURE, in simplest terms the process of the present invention involves mounting a photograph or lithograph 10, or other suitable print, to a textured material such as a sheet of canvas 50 in such a manner as to provide improved depth, brilliance and durability, thereby giving the photograph the aesthetically pleasing appearance of an oil painting. Typically the photograph is a glossy photograph having a resin coated backing which may be removed by careful manipulation. Whether a photograph, lithograph or other print is used, the backing must be removable to achieve best results with the present invention.

More specifically, the photograph 10 is first coated with a varnish 20 such as lacquer or polyurethane or other suitable resin. The photograph may additionally be bonded to a sheet of protective film 30 such as Specialtex heat seal film, manufactured by Ademco, Ltd., England, in a conventional manner. Preferably, the heat seal film is slightly perforated to prevent the formation of air bubbles or other irregularities between the protective film and the photograph. The combination of the varnish or resin coating 20 with the protective film 30 provides increased depth, durability, and fade resistance.

When coating the print with lacquer, preferably a spray gun is used rather than a spray can to obtain an even coating and avoid moisture. Any water in the spray turns the print blue. Best results are obtained with four light coats of clear lacquer that are evenly applied with each coat allowed to completely dry. The lacquer coat adds to the longevity of the color photograph because it increases dye stability and permanence.

A UV absorber can be included in the lacquer. A suitable absorber is Octyl-Dimethyl Para-Amino Benzoic Acid. This absorber can be used in an amount of 2 to 6 ounces per gallon of lacquer.

The heat seal film is evenly bonded to the photograph or lithograph, so that uneven or irregular light spots do not appear. This can be effected with an Ademco hardbed press that gives even pressure across the platen.

Preferably a polyurethane foam cover sheet is used between the top platen and the heat seal film and teflon coated paper is used between the bottom platen and the photograph.

After the photograph has been coated, and the protective film applied, the bulk of the backing of the photograph is removed, or stripped, from the photographic emulsion. Since a photograph having a glossy surface is preferably used to provide maximum brilliance and depth, although other surfaces are acceptable, only the emulsion, a reflective coating, and paper fiber remain after the photograph backing has been removed. The back of the stripped photograph is then sprayed with a chemical solution 40.

The chemical solution 40, which preferably includes a surfactant, an optical brightener, a sensitizer and dye preservative and hardener, is applied in sufficient quantity to thoroughly soak the back of the print. The chemical solution 40 is allowed to penetrate into the back of the print for a period ranging between one and three minutes for the particular chemical composition described in detail hereinafter. The soaking time is intended to let the chemical composition penetrate the photograph 10, which results in some softening of the emulsion.

Preferably the chemical solution is heated to about 150° F. prior to applying it to the print to avoid "shock" to the emulsion that could occur during the hot pressing operation described below. Such thermal shock can cause cracking of the emulsion.

Once the resin coated backing is removed and the chemical formula is applied, within two minutes an observer can see the image intensifying and showing through from the back. The most obvious intensifying of the colors are in the warm (yellow/red) color spectrum (the furthest layer from the chemical soaking) which indicates the chemical penetrates all emulsion layers. This chemical penetration has also been proven using the new 3M canvas transfer color paper, as the chemical soaks right through the emulsion, reacts with the front layers, and into the paper backing.

After the solution 40 has been allowed to soak sufficiently into the stripped photograph 10, excess solution is blotted from the photograph 10. Excess solution left remaining on the back of the print results in poor bonding. If the print is blotted with a sponge, and wiped with a paper towel (so it is slightly damp) it adheres to the canvas regardless of the length of the soaking. The penetrant action of the solution 40 has the additional feature of removing more of the paper fiber remaining attached to the emulsion, which further thins the print 10 to provide for better texturing.

Most of the fiber will be removed with a final scrub wipe of a paper towel by just pushing the fiber particles off the paper. All the fiber (if fiber is thick in places due to a poor stripping job) can be removed by applying more solution and using a fingernail to scrape the remainder off. The ability of the chemical formula to do this marks the first time it is possible to make a completely "Thinned" photographic print.

When the excess solution 40 has been properly removed, the print will feel slightly damp; any solution on the face of the photograph should be removed.

The chemical has an added advantage. With the heat seal film applied, and the print stripped of the backing, the print wants to curl in a tubular shape. If applied to the canvas in that shape, and without the chemical, it would be extremely difficult to position it properly so that it would stay in place when inserted in a press. This could possibly lead to print damage because a corner might curl up and be pressed into the print. On the other hand, the chemical completely flattens the print, and becomes a print flattener which greatly facilitates handling and alignment.

The damp photograph 10 is then arranged on a sheet of canvas 50 or other suitably textured material. While the canvas 50 is preferably impregnated with heat-activated adhesive, other bonding arrangements are also acceptable such as transfer adhesives, liquid adhesives, dry mount and other adhesive films 60. The photograph and canvas are then placed in a dry mount press such as the McDonald Professional IV series press. The face of the photograph 10 or protective film 30, if used, is not harmed during bonding. For a first pressing, the photographic canvas combination is then pressed at a temperature of from about 200° to 212° F. for a period ranging between 90 and 150 seconds, and preferably on the order of two minutes.

A protective layer of paper can be used between the canvas 50 and the top platen.

Preferably the press pressure is less than about 15 psig because at higher pressures, hairline emulsion cracks appear. Also, emulsion cracks can appear if the press temperature is above 212° F., especially in dry conditions of atmosphere that provide a high degree of static electricity. In these conditions, not only press temperature must be watched carefully, but it is necessary to run a static eliminator and humidifier near the press.

There is no way to fix these emulsion cracks. After the photograph cools more cracks appear, and when stretched on a stretcher frame the emulsion cracks get wider, are more noticeable, and multiply.

By decreasing pressure until the cracks disappear, and then giving a little more safety margin, the optimum pressure range was found. This range is between 10 and 14 psig. At this elevated pressure care must be taken to align the photograph or lithograph when fastening to a stretcher frame. This is because the photograph is pressed so deep into the canvas weave that a quarter-inch overall shrinking of the photograph occurs. It has been found, for example, that excellent results are obtained at 12 psig.

It has been found that the depth, glisten and brightness can be controlled by a second pressing. Therefore preferably a second pressing is used.

After the first pressing the press is opened to allow steam to escape. The canvas/print is removed from the press to make sure steam comes completely out from the underside. Any moisture on the press is removed.

The longer the second pressing, the more depth, glisten, and brilliance obtained. The second pressing lasts from about one to about three minutes. After three minutes, little improvement in the final product occurs. The temperature and pressure used for this second pressing are the same as used for the first pressing. The second pressing usually removes any light spots or bubbles that may remain due to poor heat-seal lamination.

Preferably a Teflon TM coated neoprene rubber pad is placed between the press and the protective film 30. It is found that the Teflon pad adds glisten and a reflective surface to the final product, particularly when moisture of the chemical solution 40 is allowed to escape in the form of steam just prior to the second pressing.

With the press at 210° F. on the canvas, the adhesive melts, and combines with the chemical formula to bond the photograph to the canvas. This temperature is optimum for bonding, but could damage the delicate photograph emulsion. The Teflon pad, however, acts as a heat-sink to preserve the emulsion of the photograph because the face of the photograph is in contact with or close to the Teflon pad. A drop of 70° F. between the top of the canvas and the face of the photograph is made possible by the Teflon pad. The temperature at the pad is approximately 140° F. This is a safe temperature level to protect the emulsion of the photograph.

After the photograph has been properly bonded to the canvas, the combination is removed from the Teflon coated pad of the press. Removal of the canvas from the pad is preferably performed in a single fluid movement so as not to harm the finish. The photograph will then stabilize after a short period of time, for example thirty minutes, to the desired intensity, brilliance and depth.

The solution has a shelf life of up to one year. Best results are achieved, however, if used within eight (8) weeks of mixing.

The chemical solution 40, as noted above, includes at least an optical brightener and a surfactant, and also preferably includes a sensitizer, and a dye stabilizer and hardener as well as a buffering agent. More specifically, the chemical solution 40 includes an optical brightener which may for example be a fluorescent whitening agent such as Tinopal SFP, a stilbene fluorescent whitening agent having the formula 7-([4-Chloro-6-(Diethylamino)-S-Triazin-2-YL]Amino)-3-Phenylcourmarin, available commercially from the Dyestuffs and Chemicals Division of Ciba-Geigy Corporation, Greensboro, N.C. Other acceptable optical brighteners include stilbene fluorescent whitening agents such as Tinopal BHS, Tinopal AP liquid and Tinopal PT liquid, or other suitable equivalent, also available from the Dyestuffs and Chemicals Division of Ciba-Geigy Corporation.

The optical brightener works in combination with other factors, to be described, to brighten the photograph, whiten the photograph, and absorb invisible ultraviolet radiation and convert it to visible, blue-white light which is emitted. This has the tendency to also mask or counteract any natural yellowing of the emulsion. It also acts to provide resistance to color fade. Part of the higher luminance values achieved with this product is a result of using an optical brightener.

Preferably the solution contains at least 0.8 gram of optical brightener per liter of solution. In an exemplary solution, 4.0 grams of Tinopal SFP powder are combined with other chemicals as described below to form one liter of solution. Acceptable results are obtained when the amount of Tinopal SFP powder is varied between 0.8 gram and 4.0 grams per liter of solution 40. Different optical brighteners require different amounts. It should be noted that the quantity of optical brightener used varies with the particular compound. For example, if Tinopal BHS is used, the amount should range between 0.8 and 10.0 grams per liter of solution; whereas if Tinopal AP or PT liquids are used, the amount should range between three and ten milliliters per liter of solution.

In addition to stilbene type fluorescent whitening agents, others that can be used are the imidazole, carbostyrile, and imidazolene type fluorescent whitening agents. Acceptable optical brighteners are Tinopal 2B, and Uvitex CV Conv., PRS which are all made by the Ciba-Geigy Corporation. Other brightening agents that can be used are sold under the trade names B, R, (Sandox), Blancophore BBU, BUP, BP (Bayer), Photine C, B (Hickson & Welch), and Celumyl B, R, S (Bezons). They are all used in stabilizer baths for print whitening. The preferred Tinopal SFP is also used in color paper manufacture. Combinations of brightening agents can be used. These fluorescent brightening agents generate visible light making the total reflected visible radiation greater than the incident visible radiation. They are not optical bleaching agents that absorb short wave lengths of light only.

Also present in the chemical solution 40 are surfactants such as nonyl phenol surfactants including Tergitol NP-9 and NP-7, available commercially from Union Carbide Corporation. Tergitol NP-9 has nonyl phenyl as the hydrophobe and nine moles of ethylene oxide as the hydrophile, and Tergitol NP-7 has nonyl phenyl as the hydrophobe and seven moles of ethylene oxide as the hydrophile. These surfactants are nonionic and function as a wetting agent to break down surface tension between the print 10 and the chemical solution 40. This further provides improved penetration characteristics of the chemical solution 40 into the print 10. In an exemplary solution six milliliters of Tergitol NP-9 and three milliliters of Tergitol NP-7 are combined with an optical brightener as described below to form one liter of solution. However, substantial variation is permissible, and thus the amount of Tergitol NP-9 used may vary between four and twelve milliliters per liter of solution, and the amount of Tergitol NP-7 used may vary from one milliliter to six milliliters per liter of solution.

Also, substantially different formulations of surfactants produce acceptable results. For example, slightly better brightness results, and (after bonding) the canvas weave is slightly more pronounced when a formula of Tergitol NP-7 and NP-9 is used wherein the amount of Tergitol NP-7 varies between four and nine milliliters per liter of solution, and the amount of Tergitol NP-9 varies between two and six milliliters per liter of solution 40. However this formulation appears less stable than the formulation described above, and also provides slightly less desirable adhesion characteristics.

The chemical solution 40 performs well as a print flattener with regular stripped photographic or lithographic paper. However, with some papers such as an easily strippable 3M canvas transfer paper, the very thin and free of paper fiber or resin coating emulsion tends to curl easily. This makes it difficult to position on the canvas and insert into the press. To increase the flattening ability of the chemical solution for all types of photographic papers from about 20 to about 80 ml, and preferably 50 ml, of ethylene glycol can be added to the chemical.

In a preferred form of the chemical solution 40, a sensitizer such as citric acid is also included for cooperation with the optical brightener and surfactant. The amount of sensitizer used per liter of solution may vary between one-half and ten grams, and may for example be five grams. A small amount of stop bath, such as ten to fifteen milliliters of acetic acid per liter of solution, may also be included.

The citric acid also serves as a preservative since it removes trace metals (silver halide grains) from the photographic print emulsion.

A dye stabilizer and hardener such as formaldehyde can be used, with the amount varying between 30 ml and 80 ml per liter of solution using a thirty-seven percent Formalin solution. An amount of 30 ml per liter of solution has been shown to provide acceptable results.

The formaldehyde stabilizes the dyes of the emulsion of the color photograph and adds to the permanence of the image for fading. A concentration of formaldehyde of 30 ml per liter of solution is desirable for good penetration of the emulsion.

Ammonia solution (25% ammonia in water) in an amount of from 3 to 20 ml per liter, can be added to increase contrast, and the ammonia makes the thin emulsion of the photographic or lithographic paper tougher, for withstanding the elevated press pressures to avoid emulsion cracks. Ammonia solution also adds to the permanence of the color photograph dye.

A basic buffering agent such as potassium hydroxide or sodium hydroxide has been found useful in adjusting the pH of the solution 40 to within an acceptable range of 5.5 to 9.5. For image permanence and to avoid deterioration to the canvas print support material a range of 7.0 to 9.5 is preferred, with a most preferred pH of 7.4 appearing to give best results. If a 45% solution of NaOH is used, ten to eighty milliliters per liter of solution is sufficient to properly adjust solution pH. Distilled water is then added to the foregoing to produce one liter of solution.

The components of an exemplary chemical solution 40 may then be summarized by the table below; for one liter of solution:

| | |
|---|---|
| Citric Acid Anhydrous-$H_3C_6H_5O_7$ | 5 Grams |
| Tinopal SFP | 4 Grams |
| Formaldehyde (Formalin 37%) | 30 ML |
| Ammonia Solution (25%) | 10 ML |
| Ethylene Glycol-($HOCH_2CH_2OH$) | 50 ML |
| Tergitol NP-9 | 6 ML |
| Tergitol NP-7 | 3 ML |
| Acetic Acid-Glacial ($CH_3COOH$) | 13 ML |
| Sodium Hydroxide (NaOH)-45% | 40 ML |

The ingredients are added in the order given to distilled or deionized water at 80° F. with stirring. The pH is adjusted to 7.4 after sufficient distilled water has been added to make one liter.

Although a solution of only Tinopal and Tergitol to one liter with water will provide brightness and penetration acceptable on a short term basis, the remaining components appear to improve stability and lifespan. It should be noted that the quantity of optical brightener used varies with the particular compound.

A preferable adhesive impregnated canvas, of fine weave 10–12 ounce tarp duck such as manufactured by McDonald Photo Products, Inc., of Dallas, Tex. is used. This canvas is pre-coated with a heat-activated adhesive with the trademark "Lamin-All".

This canvas provides the basis for a light responsive reflector. Between the cross-hatch of the canvas weave is found impregnated adhesive droplets that when activated by heat and pressure form minute bi-concave negative lens elements. Negative lenses are used to make transmitted light diverge, and have no real focus, but do have a virtual focus that is on the same side of the lens as the object. The apparent position of the object is the focal point of the virtual image. This reduces the effective candlepower of a lamp needed to properly illuminate the object.

These evenly spaced minute individual lenses cumulatively form a light-diffusing contour that is presumed to be bi-concave, because the mold for these heat formed lens shapes is the cross-hatch of the canvas itself. Since pressure is both downward and upward in a conventional mounting press such as the McDonald and Ademco presses, it is believed that what is formed is a minute bi-concave negative lens element.

The above described lens element should be considered only the rear lens element of the system; the middle element being the thinned photograph, and the heat-seal film providing the front element. All elements are bonded together to form a negative bi-concave simple lens element.

The many minute elements on this reflecting surface render it strongly diffusing in a direction at right angles to said elements. A light diffusing contour is formed which is free from any flat areas, because the threads of the canvas, and the adhesive under heat and pressure together result in the formation of a flaring bi-concave lens element that reflect light rays from the canvas at varying angles depending upon the angle of the surface at the point of impact of each light ray. The cumulative effect of all light rays upon the entire photograph area results in the appearance of more depth and brightness.

In practice, the second pressing tends to work with the chemical formula, get rid of excess water, and make ultimately a deeper penetration of the heat-seal film, photograph, and chemical into the contour of the canvas weave. This results in a brighter and more light intensifying image. When the lens elements are spread out more in size by stretching the canvas mounted photograph on a stretcher frame, the light directing reflecting lens elements give very even light diffusion, and enhance the effect by eliminating any remaining hot spots of light reflection.

This "light reflection screen" works well without any white substrate pigments, fluorescent salts, or other ingredients in addition to the process and chemical already described.

In order to prevent light from passing through the product, increase the contrast of the photograph and overall luminance gain, an aluminized or mirror-like card can be fastened behind the canvas. Also, serving the same purpose, aluminized adhesive foil can be pressed on the back of the canvas. However, an aluminized backing acts like a light absorption device instead of a reflector; and even though it increases luminance values by about 8% it concentrates light back into and at the colors in the photograph which decreases color dye stability and increases fade. An effective way to increase luminance, without increasing fade is to insert behind the textured surface a backing sheet of approximately 80 lb. or thicker gloss enamel stock known either as Kromecote (R) or Plasti-Kote (R) or equivalent in the printing trade. This is a smooth, very high gloss, very white, plastic coated material that comes within 8% of the white reflective coating listed below in luminance gain. This backing sheet contains titanium dioxide which absorbs UV radiation, and increases photograph dye stability permanence.

Another way to increase luminance without increasing fade is with a white reflective coating that combines with the adhesive in the canvas under heat and pressure. The white canvas coating results in reflection and negligible absorption of light which adds to the fade resistance properties of the product as well as the luminance values. Encapsulation of the rear of the photograph with a coating further isolates the photograph from the elements to provide protection.

A white coating formula is brushed on the canvas prior to mounting the photograph and allowed to dry until it becomes a tacky substrate for the photograph. Two chemical reactions work with this coating:

1. The damp photograph that has been soaked with the chemical solution previously described contains formaldehyde. The formaldehyde reacts with gelatin of the white coating to harden it, and combines directly with the gelatin in the coating formula to form an insoluble compound. This composition adds to color fastness and helps to prevent mildew of the finished product. The white coating herein described remains tacky until the formaldehyde reacts with it.

2. The coating under heat and pressure is forced between the threads of the canvas creating a small spread of the canvas, and a larger, more pronounced lens element. The adhesive impregnated already in the canvas combines under heat and pressure with this coating to form a brighter and more reflective lens element.

The coating formula contains a binder, pigment, and fluorescent brightening agent. The binder can be a combination of gelatin and glycerin, the glycerin providing flexibility. White pigment such as titanium dioxide and barium sulfate can be used. Titanium dioxide absorbs UV radiation, helping to increase luminance and adding to the dye stability of the photograph. Any of the fluorescent brightening agents useful with the chemical solution 40 can be used with the coating formula. The formula can be as follows:

| | |
|---|---|
| 280 | ML of Water (Approximate) |
| 70–110 | Grams of Gelatin |
| 80–270 | Grams Glycerin |
| 70–110 | Grams of Titanium Dioxide |
| 4–12 | Grams of Tinopal BHS or SFP |
| 50–100 | Grams of Barium Sulfate |

The amount of water in the formula is not critical. Sufficient water is added in order to mix the ingredients properly. The amount of glycerin also is not critical since it is used as a binder to hold the chemicals together while mixing.

The ingredients are mixed in the order given following this procedure:

1. Boil the distilled water and add the gelatin slowly while boiling and with continual stirring. The gelatin must be free of lumps.

2. While stirring at a lower heat setting half of the glycerin is added followed immediately by the titanium dioxide and Tinopal. This mixture is stirred until an even, non-lumpy, white, and somewhat thick mixture results.

3. The mixture is boiled at the lowest heat possible, and the other half of the glycerin is added followed immediately by the barium Sulfate. Water is added as required to prevent the mixture from becoming too viscous. This mixture is applied to the canvas while it is hot.

4. The mixture is spread evenly with a roller or flat brush. A thin coating on the canvas that leaves a solid white even texture appearance is all that is necessary. Overcoating is to be avoided.

5. Within two hours the coating is ready to use. It remains tacky and sticky and very flexible. It does not crack during handling. There is no trouble in bonding the photograph to it and the canvas. Due to the flexible nature of this coating it can easily be stretched with the canvas and photograph.

6. The coating is soluble in water and with heat mixes with the adhesive in the canvas and conforms to the cross hatch contours of the canvas weave.

An exemplary canvas coating paste formula is:

| | |
|---|---|
| 310 | ML Distilled Water |
| 80 | Grams Gelatin |
| 220 | Grams Glycerin |
| 70 | Grams Titanium Dioxide ($TiO_2$) (Reagent Powder-Anatase Form) |
| 12 | Grams Tinopal BHS |
| 80 | Grams Barium Sulfate ($BaSO_4$) (Baryta) |

Preferably the weight ratio of gelatin to white pigment is from about 1:1 to about 1:3.

A photograph mounted according to the present invention has significantly greater luminance and significantly greater permanence (i.e., lack of fade), than a conventional photograph: The increase in luminance is contributed to by the lacquer coating, the brightener in the chemical solution, the second pressing, and the glossy white backing sheet or the white coating.

The increase in dye stability is contributed to by the lacquer containing UV inhibitor; heat seal film; complete encapsulation of the photograph; the formaldehyde, optical brightener, citric acid, and ammonia in the chemical solution; the second pressing; and the glossy white backing sheet or the white paste coating containing titanium dioxide.

Having fully described preferred versions of the invention, it is to be understood that numerous equivalents and alternatives which do not depart from the spirit of the present invention will be apparent to those skilled in the art given the teachings herein, and these alternatives and equivalents are intended to be included within its scope.

What is claimed is:

1. A print bonded to a surface, said print being a photograph or lithograph with backing stripped therefrom, at least a portion of the print and the surface being impregnated with a chemical composition comprising surfactant, optical brightener, and ammonia.

2. A print bonded to a surface, said print being a photograph or lithograph with backing stripped therefrom, at least a portion of the print and the surface being impregnated with a chemical composition comprising a surfactant and an optical brightener.

3. The print of claim 2 in which the chemical solution comprises ethylene glycol.

4. The print of claim 2 in which the chemical composition comprises a sensitizer.

5. The print of claim 2 in which the chemical composition comprises a dye stabilizer.

6. A laminate, comprising: a thinned print having a front side and a back side, said thinned print having been a print before a backing was stripped from the print, the thinned print having been exposed to a chemical solution comprised of water, an optical brightener and a surfactant; a varnish coating applied to the front side of the thinned print; and a mounting material having a textured surface bonded to the back side of the thinned print.

7. A laminate as recited in claim 6 further comprising a protective coating applied to the varnish coating.

8. A laminate as recited in claim 7 wherein the protective coating is perforated and evenly bonded to the varnish coating.

9. A laminate as recited in claim 6 wherein the chemical solution is further comprised of a sensitizer.

10. A laminate as recited in claims 6 or 9 wherein the chemical solution is further comprised of a dye stabilizer.

11. A laminate as recited in claim 10 wherein the chemical solution is further comprised of a hardener.

12. A laminate as recited in claim 10 wherein the chemical solution is further comprised of a buffering agent.

13. A laminate as recited in claim 10 wherein the chemical solution is further comprised of ammonia.

14. A laminate as recited in claim 6 wherein the thinned print is bonded to the mounting material by an adhesive impregnated in the textured surface of said mounting material.

15. A laminate as recited in claim 14 wherein the adhesive is comprised of a plurality of adhesive droplets which form a plurality of minute negative lens elements.

16. A laminate as recited in claim 15 wherein a negative simple lens element is formed by the plurality of minute negative lens elements, the thinned print and the protective coating.

17. A laminate as recited in claim 16 wherein the negative simple lens element is bi-concave.

18. A laminate as recited in claim 16 wherein a white coating is formed between the thinned print and the mounting material.

19. A laminate as recited in claim 18 wherein the white coating is comprised of a binder, a pigment and a fluorescent brightening agent.

20. A laminate as recited in claim 6 wherein the mounting material is comprised of an adhesive impregnated canvas of fine weave 10–12 ounce tarp duck.

21. A laminate, comprising: a thinned print obtained from a print having a front side and a back side, said print comprising an emulsion, a reflective coating and a paper fiber backing, the thinned print having the backing stripped from the back side of the print and the emulsion softened by exposure to a chemical solution comprised of an optical brightener and a surfactant; a varnish coating applied to the front side of the thinned print; a protective coating applied to the varnish coating; and a mounting material having a textured surface bonded to the back side of the thinned print, the protective coating being pressed so as to at least partially conform to the textured surface of the mounting material.

22. A laminate as recited in claim 21 wherein the protective coating is perforated and evenly bonded to the varnish coating.

23. A laminate as recited in claim 21 wherein the mounting material is comprised of an adhesive impregnated canvas of fine weave 10–12 ounce tarp duck.

24. A laminate as recited in claim 21 wherein a white coating is formed between the thinned print and the mounting material.

25. A laminate as recited in claim 24 wherein the white coating is comprised of a binder, a pigment and a fluorescent brightening agent.

26. A laminate as recited in claims 21 or 25 wherein the chemical solution is further comprised of a dye stabilizer.

27. A laminate as recited in claim 26 wherein the chemical solution is further comprised of a hardener.

28. A laminate as recited in claim 26 wherein the chemical solution is further comprised of a buffering agent.

29. A laminate as recited in claim 26 wherein the chemical solution is further comprised of ammonia.

30. A laminate as recited in claim 21 wherein the thinned print is bonded to the mounting material by an adhesive impregnated in the textured surface of said mounting material.

31. A laminate as recited in claim 30 wherein the adhesive is comprised of a plurality of adhesive droplets which form a plurality of minute negative lens elements.

32. A laminate as recited in claim 31 wherein a negative simple lens element is formed by the plurality of minute negative lens elements, the thinned print and the protective coating.

33. A laminate as recited in claim 32 wherein the negative simple lens element is bi-concave.

* * * * *